Figure 1:
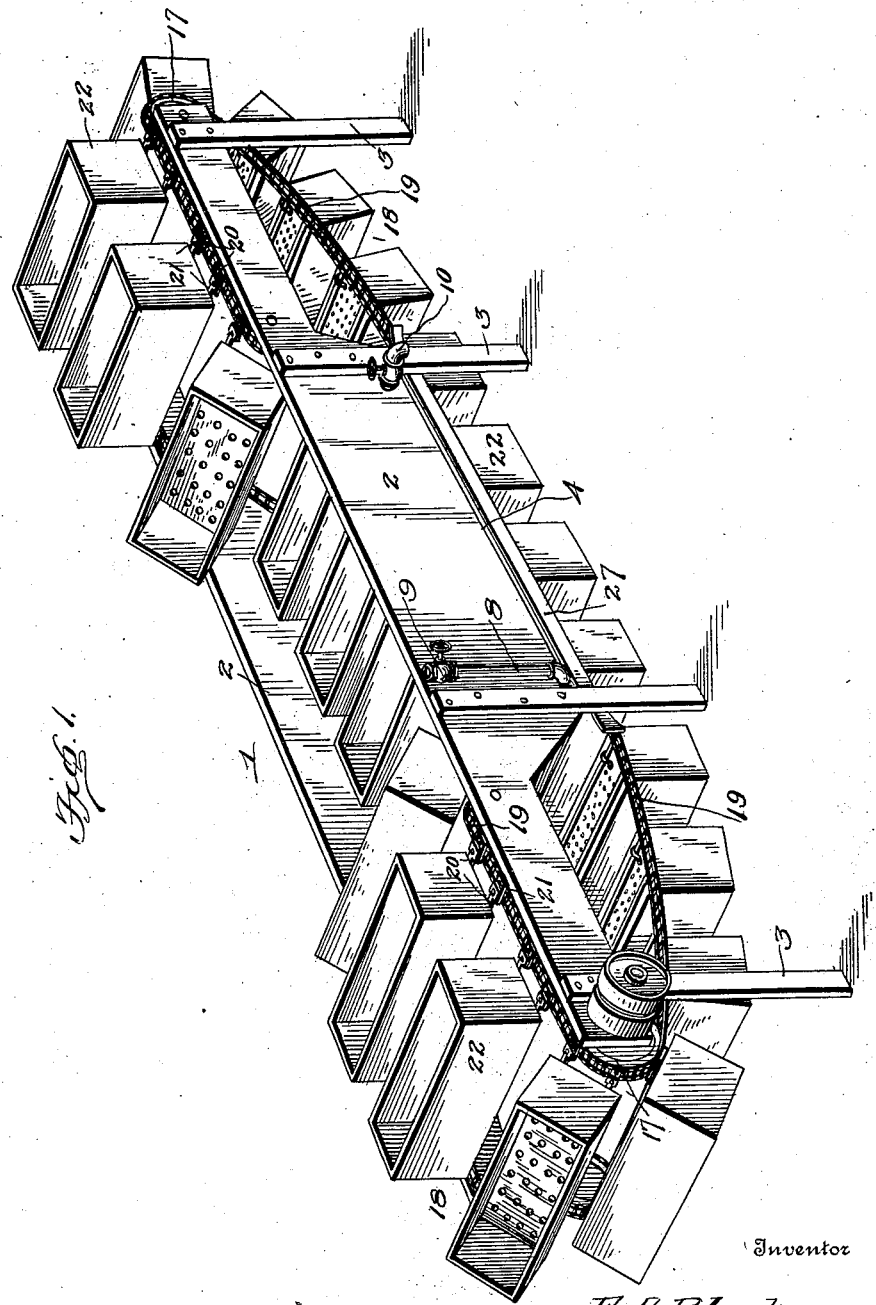

No. 727,271. PATENTED MAY 5, 1903.
F. A. BLACKMON.
VEGETABLE BLANCHING MACHINE.
APPLICATION FILED MAY 26, 1902.
NO MODEL. 3 SHEETS—SHEET 1.

Witnesses
Inventor
F. A. Blackmon
By H. B. Willson & Co
Attorneys

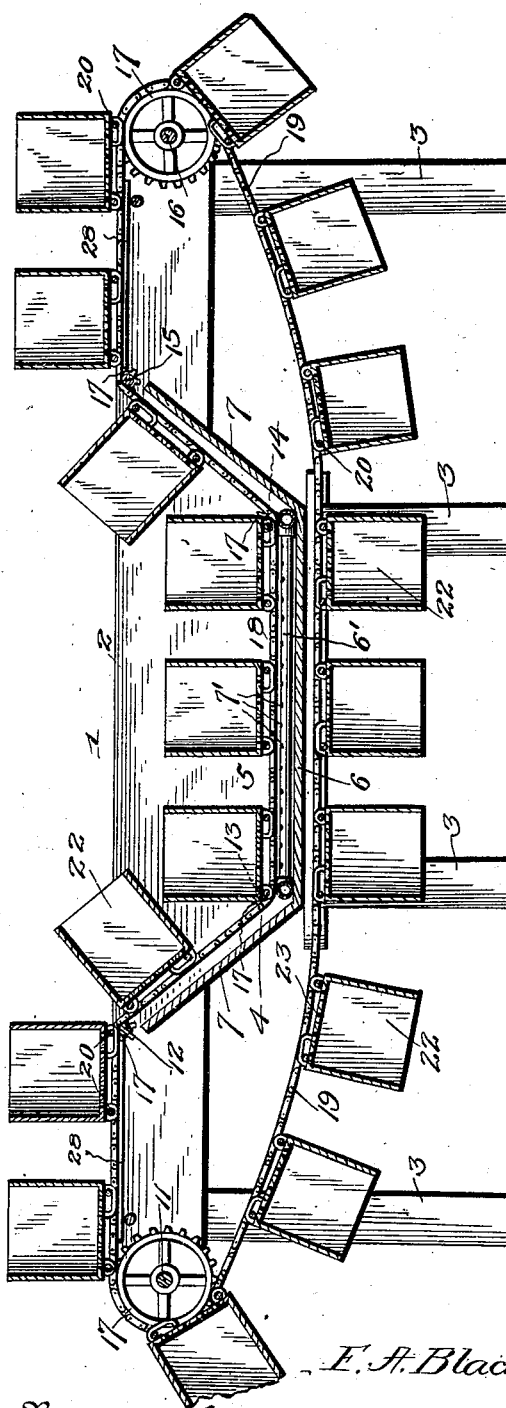

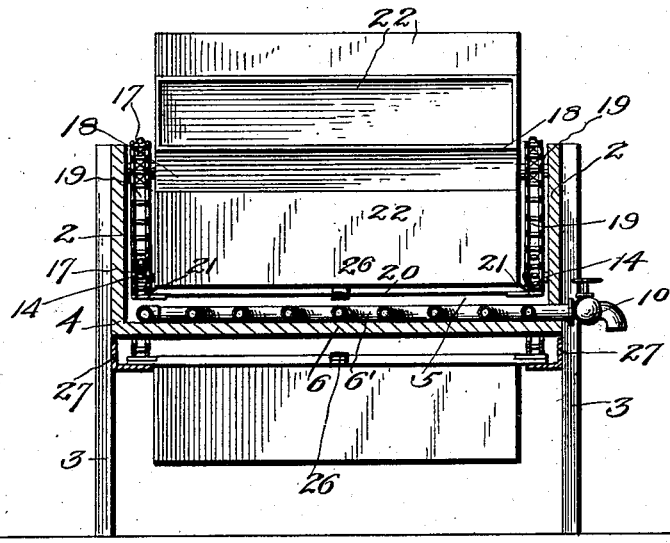
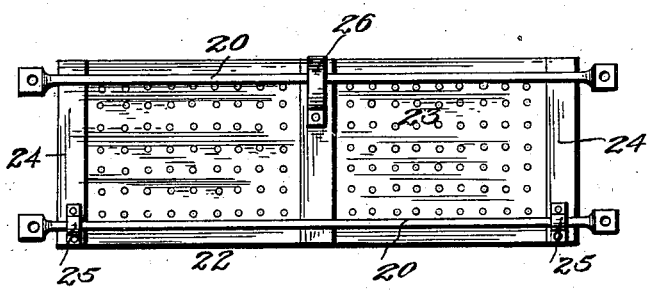

No. 727,271. Patented May 5, 1903.

UNITED STATES PATENT OFFICE.

FRANK A. BLACKMON, OF GENEVA, NEW YORK, ASSIGNOR OF TWO-THIRDS TO C. C. GATES AND T. H. DENSMORE, OF GENEVA, NEW YORK.

VEGETABLE-BLANCHING MACHINE.

SPECIFICATION forming part of Letters Patent No. 727,271, dated May 5, 1903.

Application filed May 26, 1902. Serial No. 108,974. (No model.)

*To all whom it may concern:*

Be it known that I, FRANK A. BLACKMON, a citizen of the United States, residing at Geneva, in the county of Ontario and State of New York, have invented certain new and useful Improvements in Vegetable-Blanching Machines; and I do declare the following to be a full, clear, and exact description of the invention, such as will enable others skilled in the art to which it appertains to make and use the same.

The invention relates to vegetable-blanching machines which may also be used for scalding or cooking vegetables and fruits for canning purposes, the special object in view, however, being to provide a machine of this character which shall be simple of construction, durable in use, comparatively inexpensive of production, and efficient in action, and by means of which peas to be canned may be expeditiously treated with the expenditure of a minimum amount of labor.

With these and other objects in view the invention consists of certain novel features of construction, combination, and arrangement of parts, which will be hereinafter more fully described, and particularly pointed out in the appended claim.

In the accompanying drawings, Figure 1 is a perspective view of the machine. Fig. 2 is a longitudinal vertical sectional view. Fig. 3 is a cross-sectional view, and Fig. 4 is a bottom plan view, of one of the buckets or receptacles.

Referring to the drawings, 1 denotes the frame of the machine, which consists of the longitudinal side pieces 2, supported by legs or standards 3. The side pieces 2 intermediate their ends have downward extensions 4, which form the sides of a tank 5, 6 representing the bottom of said tank, and 7 the ends thereof. Within the tank 5 is arranged in zigzag form a steam-pipe 6', having jet-openings 7' for the escape of steam and communicating with an inlet-pipe 8, provided with a controlling-cock 9.

10 denotes a draw-off cock to permit of the flushing and cleaning of the tank. The steam escaping from said pipe is adapted to heat the water within the tank and keep it at the desired temperature.

11, 12, 13, 14, 15, and 16 denote shafts journaled in the side pieces of the frame and connecting said side pieces together, and each of these shafts is provided with two sprocket-wheels 17, which are fixed thereto.

18 denotes an endless conveyer comprising sprocket-chains 19, which are engaged with said sprocket-wheels and connected together by cross-bars 20, which are riveted to ears 21, projecting laterally from the chains at equidistant points in the length of said chains. Said chains pass over the sprocket-wheels carried by the shafts 11, 12, 15, and 16 and under the sprocket-wheels carried by the shafts 13 and 14, as more clearly shown in Fig. 2 of the drawings. Power may be applied to any one of these shafts—for instance, the shaft 11, which is shown as being provided with a band-wheel to be connected by a belt to any suitable source of power-supply.

22 denotes the buckets or receptacles, each of which is preferably, though not necessarily, made rectangular in form and provided with an open-work bottom 23. Straps 24 are secured to the sides of these buckets, and extending across the bottom and connected to the forward ends of the end straps are loops 25, which embrace one of the cross-bars 20 and form a hinged connection between the bucket and said cross-bar, while the rear loop 26 is connected to the rear end of the central strap and embraces a cross-bar at the rear. This manner of connection of the bucket with the chains permits of said bucket adjusting itself and freely rounding the sprocket-wheels.

27 denotes guides secured to the legs or standards and located immediately below the tank and preferably consisting of angle-irons, the horizontal ledge portions of which are adapted to support the lower runs of the chains and permit them to freely pass over the same and prevent said runs, with their buckets, from sagging. 28 denotes similar guides secured to the inner faces of the side pieces 2 near their ends and adapted to support the upper runs of the chains.

In operation the tank is filled with water and the vegetables to be treated are placed in the buckets at the right-hand end of the machine and the drive-shaft set in motion. The buckets will then be successively drawn along and over the guides 28 and then will be submerged in the tank and drawn across the bottom thereof and up along the guides at the left-hand end of the machine, and as they turn around the shaft 11 they will discharge their contents into a suitable receptacle or conveyer, thus thoroughly blanching the vegetables. If it be desired to cook the vegetables or prepare them for canning purposes, the speed of movement of the conveyer may be reduced, so as to allow the buckets to remain in the tank a longer period of time. As the buckets ascend and are drawn to the left-hand end of the machine the contents of the buckets are allowed to drain or dry before they are discharged into the receiving-receptacle, while those coming up from under the machine at the right-hand end thereof may be filled by an attendant standing at that end of the machine. It will thus be seen that the vegetables or fruit may be expeditiously treated, blanched, cooked, and by cutting off the steam cooled, if desired, and labor and expense incident thereto materially reduced.

From the foregoing description, taken in connection with the accompanying drawings, the construction, mode of operation, and advantages of the invention will be readily understood without requiring an extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

In a vegetable-blanching machine, the combination of a tank, a flexible endless conveyer comprising a pair of parallel endless chains, direction elements to guide the same to, through and out of the tank, cross-bars connecting said chains together, and vessels carried by the conveyer, each of said vessels having cross-straps on its lower side, provided at the front end with loops engaging and forming a pivotal connection with one of the cross-bars and provided at their rear ends with elongated loops engaging and forming a pivotal and slidable connection with another of said cross-bars, substantially as described.

In testimony whereof I have hereunto set my hand in presence of two subscribing witnesses.

FRANK A. BLACKMON.

Witnesses:
F. S. BRONSON,
L. W. KEYES.